Oct. 9, 1956  W. A. HEIDMAN, JR  2,766,343
DIRECTION SIGNAL SWITCH
Filed Nov. 6, 1950  2 Sheets-Sheet 1

INVENTOR
WILLIAM A. HEIDMAN, JR.
BY Liverance and
Van Antwerp
ATTORNEYS

Oct. 9, 1956 — W. A. HEIDMAN, JR — 2,766,343
DIRECTION SIGNAL SWITCH
Filed Nov. 6, 1950 — 2 Sheets-Sheet 2

INVENTOR
WILLIAM A. HEIDMAN, JR.
BY Liverance and Van Antwerp
ATTORNEYS

United States Patent Office 2,766,343
Patented Oct. 9, 1956

2,766,343

DIRECTION SIGNAL SWITCH

William A. Heidman, Jr., East Grand Rapids, Mich.

Application November 6, 1950, Serial No. 194,230

5 Claims. (Cl. 200—61.29)

This invention relates to a direction signal switch, and is concerned with improvements and novel structure in switches which are used with automobiles to indicate, by selectively closing one of two lighting circuits, a direction of turning at a corner which the automobile is to take.

Present directional switches of this kind are, as commercially produced, controlled from the steering column of the automobile by a lever immediately underneath the steering wheel. Such lever is mounted for a pivotal or rocking movement and is manually pulled downward when a turn of the automobile is contemplated to be made to the left, and pushed upward when the turn of the automobile is in the opposite direction. Such lever remains in the position to which moved until the turn is completed, and upon reversing the movement of the steering wheel, to straighten up the direction of movement of the automobile after the turn is completed, the lever is automatically returned to its central, neutral position. When the lever is operated in either direction, appropriate lights at front and rear are lighted, either shining steadily or, in general, flashing intermittently in quick succession, such flashing of the lights being at one side of the automobile for a turn thereof in that direction and at the opposite side when to be in the opposite direction.

My present invention has for its object and purpose a change direction switch which will, preferably, be foot operated, mounted at the floor of the front or driving compartment of a motor vehicle so that the considerable length of wiring which must be used with present structures housed, within the steering column, is eliminated. It is a further object and purpose of the invention to provide a switch of the character stated which is less costly to manufacture and much less costly to install, has less parts to wear or break and does not require manual disengagement in the event that the operator, having moved the control lever in a direction for an intended turn, changes his mind and does not make such turn. In such circumstances the lever must be manually returned to its central, neutral position. Furthermore, the steering column mounted manually controlled lever for the present commercially used change direction signals is in itself, provided with a signaling means to call the attention of the driver to the fact that the lever needs to be returned to its initial neutral position, in the event that the conteemplated turn, or if a turn through less than a predetermined angle is not made. A further object of the present invention is to provide a switch which makes it possible between cross roads in heavy city traffic, or on highway lanes, to indicate that a passing of another vehicle is anticipated or intended, or that change over to an inner or outer lane of a multiple lane road is to be made.

With my novel structure, a unit is provided which has two foot operated controls one for the right and the other for the left hand anticipated turn to be made, which operate a single directional switch and in which, when the foot operated control is released, the switch contacts automatically separate and the signal light is not thereafter lighted. Each of said two foot operated controls are independently operable and in practice one only will be operated at a time. However, if through accident or inadvertence, both are simultaneously operated there is no destructive or damaging strains or stresses occurring, and no damage is done. The novel structure of the switch includes many parts which may be duplicated so that dies and fixtures for fabricating the elements which are later assembled to make the novel switch of my invention are reduced in number, with attendant reduction in cost. The switch may also be removed or replaced without disassembling other parts of the unit or removing the entire unit from the floor on which mounted. This results in simplicity in testing for repair and in economy in replacement.

To the ends stated and for the object and purposes which have been enumerated, and other objects not at this time specifically stated, I have produced the novel change directional switch, an understanding of the construction and operation of which may be had from the following description, taken in connection with the accompanying drawings, in which, Fig. 1 is a plan view of the signal directional switch unit of my invention.

Like reference characters refer to like parts in the different figures of the drawings.

Figure 1:
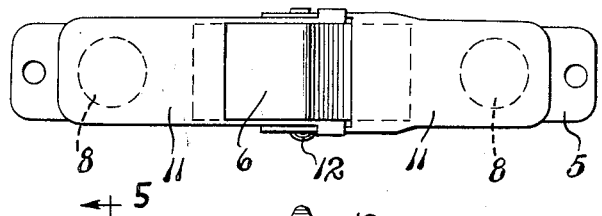
Figure 2:
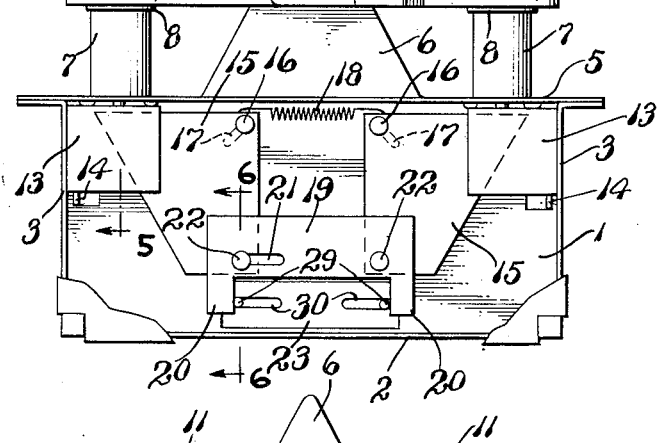
Fig. 2 is an elevation thereof, one of the side plates of a housing for mechanism thereof being removed to show interior operation structure with such structure at neutral position.
Figure 3:
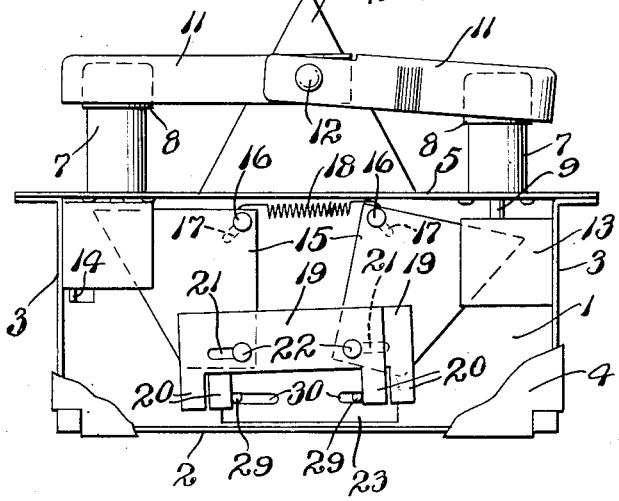
Fig. 3 is a view like that shown in Fig. 2, one of the dual control parts being depressed and with the mechanism within the housing shown as operated thereby.
Figure 4:
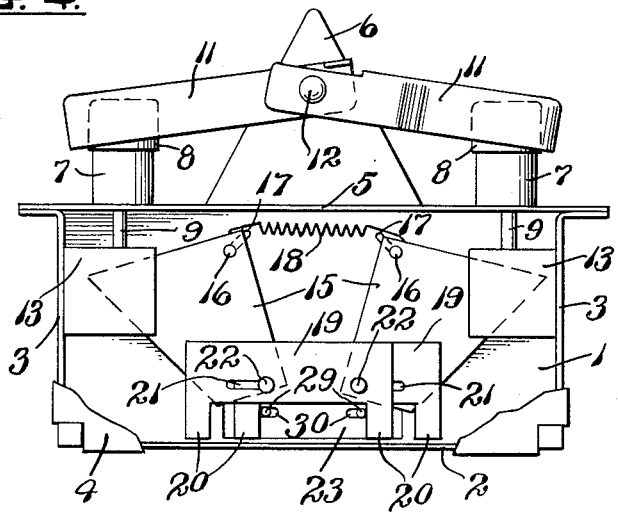
Fig. 4 is a view like Figs. 2 and 3, showing both of the dual control devices depressed and illustrating the positions taken by the mechanism upon such happening.

In the illustrated construction of a preferred embodiment of my invention, a housing is provided having a vertical side 1, a bottom 2, vertical ends 3 and an opposite vertical side 4 which, as indicated fragmentarily in Figs. 2, 3 and 4, may be separable from the remainder of the housing. However the specific construction of the housing is not, as to details thereof, an essential feature of the invention.

The open top of the housing is closed by a horizontal top plate 5 which may be secured to outwardly extending flanges at the upper end of the ends 3. From the central portion of the top 5 a triangular member 6 extends upwardly the sides of which diverge downwardly from each other, one toward each end of the top plate 5. In the installation the mounting of the housing is on the front floor board at any convenient position as for example adjacent the place where the dimmer lights control is now located, though not necessarily at such point of location, but at any place where it is conveniently reached by the foot of the driver.

Adjacent each end of the housing a vertical sleeve 7 of sheet metal is permanently connected to and extends upwardly from the top 5. It may be connected in any suitable manner but in practice tongues at the lower end extend through openings in the top 5 and are clenched over against its underside. Each of the sleeves 7 at its upper end has an inverted cuplike cap 8 telescoping thereover. A rod 9 is permanently secured at its upper end to the top of each cap 8, and extends downwardly through the sleeve 7 and freely through the plate 5 with a coiled compression spring 10 around each rod 9 bearing at one end against the cap and the other against the top plate 5 so as to normally lift each cap 8 to an upper position. The rods 9 act as control members, and have parallel actuating strokes applying control forces to the mechanism hereinafter described.

Two foot operated levers 11 are pivotally connected at adjacent ends, as at 12, on the member 6, and extend from the pivot, one over one cap 8 and the other over the other cap 8 so that by a downward pressure upon a lever 11, the covering cap 8 under it is telescoped over the upper end of its associated sleeve 7, and the rod 9 moved longitudinally in a downward direction, its spring 10 being compressed. Upon release the spring will return the parts with which associated to their normal upper position.

By reason of the diverging angular sides of the member 6 the foot operating a lever 11 will operate one only thereof. Of course it would be possible to operate both levers or foot members 11 simultaneously by pressure thereupon by the two feet of the driver of the car though this is not the manner in which it is intended to be used. It is further evident that the downward movement of the rod 9 may be accomplished by a foot pressure against the upper side of the cap 8 connected therewith without making use of foot levers or members 11, and the invention is not restricted to the use of such levers, as the operation may be done if such levers are not used.

Figure 5:
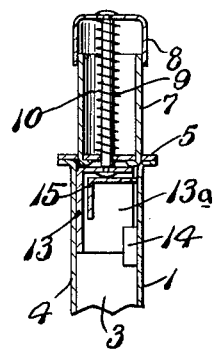
Fig. 5 is a vertical section through one of the foot operated switch controls, taken substantially on the plane of line 5—5 of Fig. 2.
Figure 7:
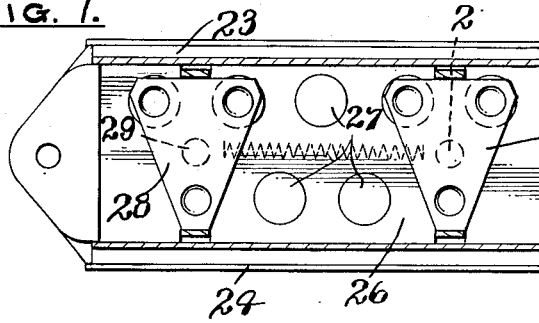
Fig. 7 is a longitudinal vertical section substantially on the plane of line 7—7 of Fig. 6 looking in the direction indicated.
Figure 6:
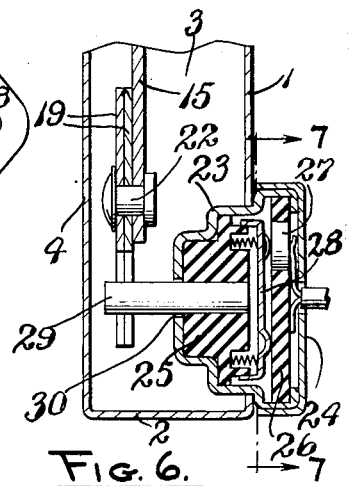
Fig. 6 is an enlarged fragmentary vertical section, substantially on he plane of line 6—6 of Fig. 2

At the lower end of each rod 9, underneath the top plate 5, a slidably mounted angle member 13 is mounted having one side against the plate 4 (Fig. 5) and another side at right angles thereto, indicated at 13a, against the adjacent end 3 of the housing. A horizontal ledge extends from the upper edge of the side 13, as shown in Fig. 5, to which the lower end of its associated rod 9 has connection. The sides 13a are guided between the ends 3 against which they bear and tongues 14 struck from the vertical side 1 of the housing for holding and guiding such members 13 in the up and down movements thereof.

Two cranks 15 of a preferred trapezoidal form shown in Figs. 2 to 4 inclusive are each pivotally mounted by means of a pin 16, one through each of the inner upper corner portions thereof. Pins 16 extend through short slots 17 in the side plate 1 of the housing. Such cranks extend from their pivots underneath the upper ledges of the members 13, so that on short downward movements of the rods 9, the cranks are swung from their generally vertical position shown in Fig. 2 inwardly at their lower ends. In Fig. 3, the rod 9 at the right has been moved downwardly by foot pressure, and crank 15 associated with the sliding member 13 connected with the rod has been thus swung, while in Fig. 4 both rods 9 being moved longitudinally downward, both of the cranks 15 are swung toward each other at their lower end portions. A coiled tension spring 18 connecting at its ends, above the headed pins 16, to the cranks 15, normally serves to move the cranks 15 away from each other at their lower ends and to the position shown in Fig. 2.

Between the lower ends of the cranks 15, two plates 19 located against each other are positioned each at each end having a downwardly extending leg 20, the two legs 20 being spaced from each other. Each of the plates 19 has a horizontal slot 21 therein. A headed pin 22 passes through both plates 19 one through the slot 21 in one of said plates and thence directly through the other plate and through a crank 15, while the other pin 22 passes through the slot of the other plate 19, through the other crank 15, and through the first plate 19, through the slot 21 of which the first pin 22 passes. Thus (referring to Fig. 3) when the crank 15 at the right is rocked clockwise as shown, the shank of the pin 22 associated therewith traverses the slot 21 of one plate 19 so that such plate 19 does not move, but the other plate 19 is moved longitudinally to the left, the other pin 22 passing through the slot 21 of the plate 19 moving to the left traversing said slot so that the opposite crank 15 remains stationary without moving. And of course by depressing the other foot operated member or pedal 11 the crank 15 at the left would be rocked while the one at the right would remain in position.

When, as may occur accidentally or inadvertently at times, both of the foot pedals 11 are depressed by foot pressure thereon, both of the cranks 15 are swung toward each other at their lower end portions and both plates 19 are longitudinally moved in opposite directions as shown in Fig. 4.

At the lower portion of the side plate 1 of the housing, through a rectangular opening therein, a switch is mounted. In the installation of the switch, a metallic housing member 23 is closed at its side within the main housing. It has an open outer side which is covered by a removable flanged cover 24. Within the switch housing member 23 two blocks 25 of insulating material are slidably mounted, having a compression spring between them to normally separate them. Directly at the open side of said switch housing member 23 a plate 26 (also of insulating material) is secured, closing the open outer side of the housing member 23. The plate 26 carries a plurality of separated or spaced contacts 27.

Between the plate 26 and the blocks 25, two metal contact members 28 of the form shown are mounted, one connected with each of the movable blocks 25 to move therewith, and spring pressed to move dimples pressed outwardly therefrom into bearing engagement with the inner side of the insulating plate 26, or contacts 27 thereon.

A horizontal pin 29 is permanently connected with each of the blocks 25 and extends therefrom through a horizontal slot 30 through the inner side of the housing member 23. The two pins 29 therefor are located between the downwardly extending legs 20 of the movable members 19.

In the central neutral position of the structure described, shown in Fig. 2, such pins 29 are at the outer ends of the slots 30 and are against the inner vertical edges of the legs 20, one against each leg of each plate 19. Upon depressing a foot lever 11 at the right, as in Fig. 3, the movement of the outermost plate 19 to the left causes the leg 20 at the right to move the pin 29 to the left, traversing the slot 30 through which such pin 29 passes, and thereupon moving the block 25 and the contact member 28 movable therewith over the face of the plate 26 so as to bridge selected contacts 27 and close an electric circuit leading to the direction indicating lights at a side of the automobile. If the opposite foot pedal 11 is depressed, the other or back member 19 is moved to the right so that the other switch member, comprising a block 25 and its contact plate 28, is moved to bridge between other circuit making contacts on the plate 26, closing the circuit to the direction indicating lights at the opposite side of the automobile. In practice, preferably, the main housing consisting of the vertical side 1 and parallel cover plate 4, ends 3, bottom 2 and top 5 will be of metal, facilitating attachment of parts and enhancing durability.

It is evident that with the structure described, one driving an automobile equipped with the direction signal of my invention, on approaching a crossing where a turn is to be made, will depress the lever, either the one which is at the right of the member 6 or at the left, in accordance with the direction intended to be taken. So long as such downward pressure on the selected lever 11 is maintained, the lighting signal for indication of the selected direction of turning will be operated. If before reaching such place of turning, the driver changes his mind, he merely removes his foot and releases pressure from the selected lever 11 and the light indicating a turn is about to be made will be extinguished. Also, if one is in one lane of a multiple lane highway or street and desires to move over into another lane, either to the right or left, this can be indicated to those following behind by a proper operation of a foot lever 11 for the right or left of the lane in which the automobile is moving; and after such selected lane is reached the foot pedal 11, which has been downwardly pressed, released. If through inadvertence both the levers 11 are depressed there is no strain upon any of the parts and all that will occur will be that all signal lights will be operated and lighted until pressure is released.

Mounted upon the foot board of the front driving compartment of an automobile, what extends above the foot board is those parts of the structure above the top plate 5, which may be at any convenient place, readily accessible by the driver of the automobile. Such novel switch of my invention is readily installed and is easily accessible for repair or replacement without requiring disassembly of other parts of the adjacent structure of the automobile. The several parts which make up the switch structure are largely in duplicate, made by the same dies. The fabrication and assembly is very economical so that the cost is low. The immediate switch housed within the housing members 23 and 24 is a stock article of the electric fixture trade and may be purchased on the open market. Complications of wiring are avoided. A further or secondary signal which operates to inform the driver that the change direction signal is in operative position, for the purpose of causing him to manually return the operating lever of the change direction signal to neutral position is entirely eliminated, with attendant complications of wiring, and expense for such secondary signal.

With the structure described, a short downward movement of the rod 9 results in an increased lateral movement of the crank 15 with which associated, by reason of the interposed vertically movable member 13 connected with the rod 9 bearing against crank 15. The downward movement of the rod 9 should be as short as possible, with an attainment of the necessary movement of the switch member which is actuated, and the structure which I have produced attains this result in a very simple and economical way. The sliding bars 19 having the downwardly extending spaced fingers 20 are economically produced and assembled, and in the novel arrangement of them and their connections to their actuating members, ample space is provided for receiving the pins 29 and to allow for the arc of movement of the pivotally mounted members 15.

The immediate switch structure itself, as a unit, is one which will be last put in place and secured, and which may be removed for repair or replacement at any time without disassembling any other part of the structure. Preferably, the cover 24 for the housing member should be of non-conductive material or covered therewith. A very simple practical, effective, and economical device for the purpose for which it has been designed is produced, one which is easily operable and in which the change direction signal lights are extinguished as soon as foot pressure is removed from either the cap 8 or lever 11 over it which is subjected to such pressure, so that there does not occur, as now frequently occurs with structures now used, a long continued blinking of the lights after a turn has been made, where the turn has not been of a sufficient angle to return the manually operated lever underneath the steering wheel automatically to its neutral position. This occurs irrespective of the fact that signal means are used with present lever operated devices of this character underneath the wheel intended to inform the driver, but which are not noticed, particularly flashing light signals on the manually operated lever in the daytime. With my invention, such signaling means for driver information is not needed and is eliminated with a consequent greater economy.

The invention is defined in the appended claims and is to be considered comprehensive of all forms of structure coming within their scope.

I claim:

1. In combination with an electric switch, said switch having two operating members with coaxial paths of movement, an actuating mechanism comprising: a housing having mounting means for receiving and securing said switch; first and second control members mounted on said control housing, said members having substantially parallel actuating strokes directed on opposite sides of the position of said operating members and substantially perpendicular to the paths of movement thereof; first and second crank means each pivotally mounted in said housing on a pin, said pins being perpendicular to the plane of the axes of said actuating strokes and resiliently secured in position in said housing against forces applied to said crank means, said first and second crank means being respectively operated by said first and second control members; and means connected to each of said first and second crank means adapted to transfer forces from said crank means to said operating members respectively to urge said operating members along said paths of movement.

2. In combination with an electric switch, said switch having at least one operating member with a path of movement, an actuating mechanism comprising: a housing having mounting means for receiving and securing said switch; first and second control members mounted on said control housing, said members having substantially parallel actuating strokes directed on opposite sides of the position of said operating member and substantially perpendicular to the path of movement thereof; first and second crank means each pivotally mounted in said housing on a pin, said pins being perpendicular to the plane of the axes of said actuating strokes and resiliently secured in position in said housing against forces applied to said crank means, said first and second crank means being respectively operated by said first and second control members; and means connected to each of said first and second crank means adapted to transfer forces from said crank means to said operating member to urge said operating member along said path of movement.

3. In combination with an electric switch, said switch having at least one operating member with a path of movement, an actuating mechanism comprising: a housing having mounting means for receiving and securing said switch; first and second control members, said control members having substantially parallel actuating strokes; first and second crank means each pivotally mounted in said housing on a pin, said pins being perpendicular to the plane of the axes of said actuating strokes and resiliently secured in position in said housing against forces applied to said crank means, said first and second crank means being respectively operated by said first and second control members; and means connected to each of said first and second crank means adapted to transfer forces from said crank means to said operating member to urge said operating member along said path of movement.

4. In combination with an electric switch, said switch having at least one operating member with a path of movement, an actuating mechanism comprising: a housing having mounting means for receiving and securing said switch; first and second control members mounted on said control housing, said members having substantially parallel actuating strokes directed on opposite sides of the position of said operating member and substantially perpendicular to the path of movement thereof; first and second crank means each pivotally mounted in said housing, said first and second crank means being respectively operated by said first and second control members; and means connected to each of said first and second crank means adapted to transfer forces from said crank means to said operating member to urge said operating member along said path of movement.

5. In combination with an electric switch, said switch having at least one operating member with a path of movement, an actuating mechanism comprising: a housing having mounting means for receiving and securing said switch; first and second crank means each pivotally mounted in said housing on a pin, said pins being resiliently secured in position in said housing against forces applied to said crank means; means connected to each of said first and second crank means adapted to transfer forces from said crank means to said operating member to urge said operating member along said path of movement; and actuating means for rotating said first and second crank means respectively.

References Cited in the file of this patent
UNITED STATES PATENTS

| | | |
|---|---|---|
| 1,307,927 | Robinson | June 24, 1919 |
| 1,527,151 | Davis | Feb. 17, 1925 |
| 1,973,828 | Swilik | Sept. 18, 1934 |
| 2,157,942 | Phelps | May 9, 1939 |
| 2,195,776 | Geisheimer | Apr. 2, 1940 |
| 2,252,013 | Leupold | Aug. 12, 1941 |
| 2,281,808 | Smiley | May 5, 1942 |
| 2,301,583 | Rodrick | Nov. 10, 1942 |
| 2,306,326 | Bair | Dec. 22, 1942 |
| 2,347,937 | Cross | May 2, 1944 |
| 2,535,021 | Stone et al. | Dec. 19, 1950 |
| 2,593,643 | Woolf | Apr. 22, 1952 |
| 2,636,092 | Schneider | Apr. 21, 1953 |